Nov. 9, 1948.    S. BLUMENTHAL    2,453,618
MECHANICAL SEAL FOR SELENIUM RECTIFIER CELLS
Filed Dec. 29, 1945
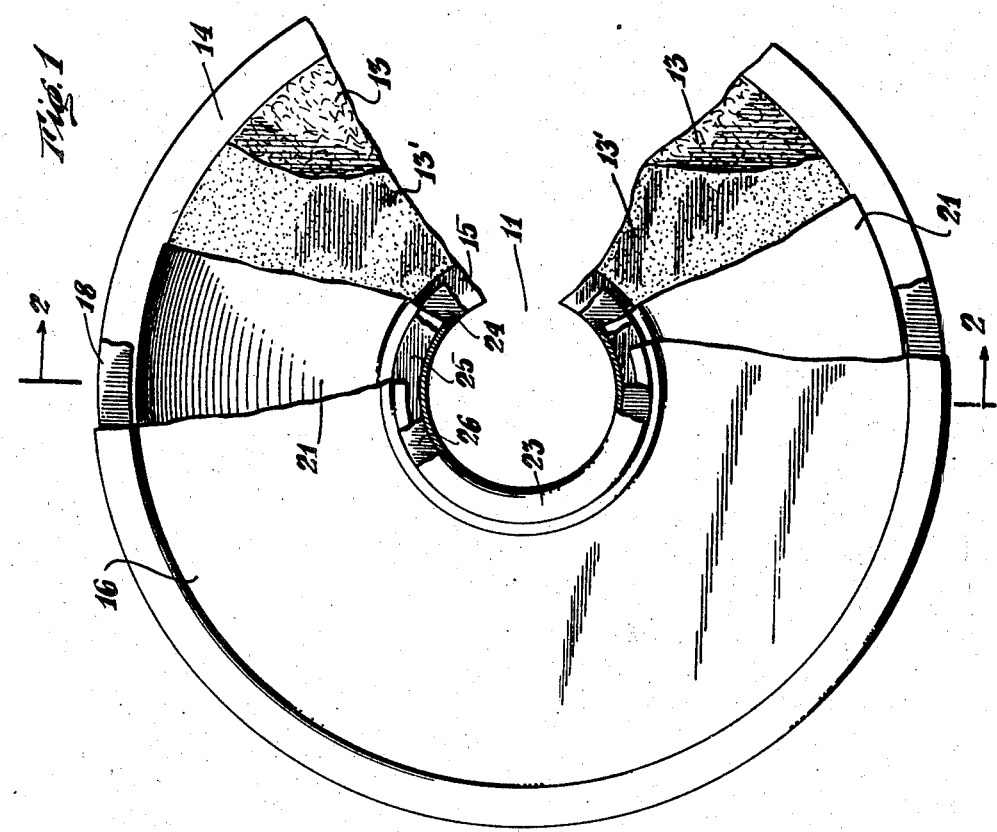
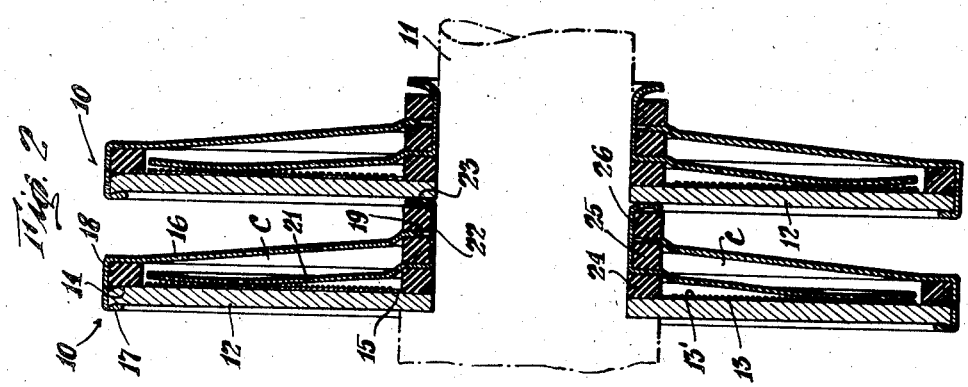
INVENTOR
Sol Blumenthal
BY
Nicholas Lauge
ATTORNEY Patented Nov. 9, 1948

2,453,618

UNITED STATES PATENT OFFICE 2,453,618

MECHANICAL SEAL FOR SELENIUM RECTIFIER CELLS

Sol Blumenthal, Indianapolis, Ind., assignor to P. R. Mallory & Co., Inc., Indianapolis, Ind., a corporation of Delaware Application December 29, 1945, Serial No. 638,049

4 Claims. (Cl. 175—366)

This invention relates to rectifiers and to an improved sealing arrangement therefor.

An object of the invention is to provide an improved sealing arrangement for rectifiers.

Other objects of the invention will be apparent from the following description and accompanying drawings taken in connection with the appended claims.

The invention comprises the features of construction, combination of elements, arrangement of parts and methods of manufacture and operation referred to above or which will be brought out and exemplified in the disclosure hereinafter set forth, including the illustrations in the drawings.

In the drawings:

Figure 1 is a front elevational view of the rectifier with parts broken away to show the detailed features of construction; and Figure 2 is a sectional view taken along the line 2—2 of Figure 1.

According to one aspect of this invention, an improved mechanical sealing arrangement is provided whereby the active surface of the rectifier is enclosed within a sealed chamber in order to permit efficient operation of the rectifier when subjected to normal or extreme atmospheric attacks as by salt moisture, or fungus.

While a preferred embodiment of the invention is described herein, it is contemplated that considerable variation may be made in the method of procedure and the construction of parts without departing from the spirit of the invention. In the following description and in the claims, parts will be identified by specific names for convenience, but they are intended to be as generic in their application to similar parts as the art will permit.

According to a preferred manner of construction, a rectifier electrode or disc having an active surface for current rectification is mounted on a suitable shaft or other support. A cap is provided for engaging the peripheral surfaces of the electrode in order to provide an effective seal against atmospheric attacks. A contact member for the active surface is mounted between the electrode and the sealing cap, this contact being provided with an external flanged portion which is adapted for contact with an adjacent rectifier cell. A sealed joint is formed between the rectifier electrode, the cap, and the contact member adjacent the supporting shaft so that the active surface is enclosed within a sealed chamber. When a plurality of cells are placed together in an assembly, contact is made between the adjacent cells by the external contact portions, and the sealing means on the shaft provides the proper spacing between adjacent rectifier cells. Such an arrangement provides a strong mechanical assembly which greatly minimizes damage caused by shocks or strains and all parts which are adjacent to the current carrying portions of the rectifier may be good conductors of heat so that dissipation of the heat produced by the rectifier is not unfavorably affected by such construction. Furthermore, the parts required are simple and inexpensive and these parts may be quickly and easily assembled.

Referring now to the drawings in detail, the rectifier may comprise a plurality of cells 10 mounted on a suitable supporting shaft 11. Each rectifier cell, in the example shown, comprises a metal disc 12 carrying a layer of selenium as at 13 upon which may be disposed a suitable counter electrode 13' formed, for example, by spraying a layer of powdered metal or other suitable conducting compound upon the selenium. It will be understood by those skilled in the art that an extremely thin blocking layer, not shown, is formed by interaction between the selenium and the counter electrode, the rectifying action being due to the effect of this blocking layer. However, my invention does not depend on the particular rectifying compound used nor the manner in which the rectification takes place as it will be apparent that the invention is applicable to other types of rectifier, such, for example, as copper-oxide rectifiers. The thickness of the selenium layer and the counter electrode, which is preferably only a few thousandths of an inch, is greatly exaggerated on the drawing for purposes of illustration. Preferably, the active rectifying layer 13 does not cover the entire surface of the disc but, instead, is applied so as to leave a peripheral inactive portion 14 and a central inactive portion 15.

A metal cap 16 is provided to seal the peripheral portions of the disc 12. The cap 16 may have a peripheral flanged portion 17 which engages the inactive side of the disc 12 to provide a sealed joint. As shown, a plastic washer 18 may be interposed between the cap 16 and the inactive surface 14 of rectifier disc to facilitate the sealing action and the assembly of the cap upon the rectifier disc. The cap may also be provided with a central aperture 19 which is of appreciably greater diameter than the shaft 11.

A contact member 21, which may conveniently be a resilient spring washer, is mounted on the shaft 11 between the cap 16 and the rectifier disc 12. The spring member 21 is urged into engagement with the active surface 13 of the rectifier disc and affords a large area of contact therewith. The contact member 21 further comprises a contact portion 22 which is seated upon the shaft 11 and extends through the aperture 19 in the sealing cap. The outer end of the contact portion 22 may be upturned as at 23 so as to contact the surface of the adjacent rectifier disc 12. It will be understood that the contact portion 22 is either insulated from the shaft 11 or else the shaft is formed of insulating material so that no short circuit will develop between adjacent rectifier cells. A sealed joint is formed between the center inactive portion 15 of the electrode, the contact washer 21 and the cap 16 by plurality of insulating washers 24, 25, and 26. It will be noted that washer 24 is mounted on the shaft 11 and seals the joint between the central inactive portion 15 of the rectifier disc and the adjacent surface of the spring washer 21. Washers 25 and 26 are mounted on the contact portion 22 and are effective to seal the joint between said contact portion 22 and the cap 16. Since the aperture 19 is of greater diameter than the shaft 11, the cap 16 does not touch the contact portion 22 so that the washers also serve to insulate these parts.

When a plurality of rectifier cells are assembled to form a complete unit, the upturned end portion 23 of each cell is compressed between the washer 26 and the adjacent disc 12 to thereby afford a good electrical contact and provide additional sealing action. Moreover, the washers 24, 25, and 26, as a group, serve to maintain the proper spacing between adjacent rectifier units. It is an important feature of the invention that the active rectifying layer 13 is enclosed within a sealed chamber C defined by the cap 16, the sealing washer 13, and the disc 12 so that the reactive compounds which are used for rectification are protected from atmospheric attacks as by salt moisture or fungus. It will be further apparent that the invention is not limited in its application but may be used with rectifiers of various types having various sizes and shapes and utilizing copper oxide or any other suitable compound instead of selenium.

Although the present invention, as to its objects and advantages, has been described herein as carried out in a specific embodiment thereof, it is not desired to be limited thereby but it is intended to cover the invention broadly within the spirit and scope of the appended claims.

What is claimed as new and desired to be secured by Letters Patent is:

1. A sealed dry disc rectifier cell comprising a supporting shaft, an apertured metal rectifier disc mounted on said shaft and having an active surface for current rectification, means including an annular apertured cap with a main body portion and an outer flange, said flange being used for sealing the peripheral portions of said rectifier disc, a resilient contact washer for engaging said active surface mounted on the shaft between the rectifier disc and said body portion of said cap, said contact washer having a portion extending through the aperture in said cap for contact with an adjacent rectifier disc, and means associated with said shaft for providing a seal between an inner portion of said rectifier disc, the portion of said cap adjacent said aperture, and the contact washer adjacent said aperture whereby the active surface of the rectifier cell is enclosed within a sealed chamber.

2. A sealed dry plate rectifier cell comprising a supporting shaft, an apertured rectifier plate mounted on said shaft and having an active surface for current rectification, an apertured metal cap including a main body portion and an outer flanged portion, said flange portion being used for engaging and sealing the peripheral portions of said rectifier plate, a member mounted on the shaft between the rectifier plate and said main body portion of said cap for contacting said active surface, said member having a contact portion extending through the aperture in said cap, and a plurality of washers for providing a seal between an inner portion of said rectifier plate, the portion of said cap adjacent said aperture and the contact member adjacent said shaft, said washers being effective to insulate said cap from said contact member.

3. A dry surface rectifier comprising a central supporting shaft and a plurality of rectifier cells mounted on said shaft, each cell comprising an apertured rectifier plate mounted on said shaft and having an active surface for current rectification which is bounded by central and peripheral inactive surfaces, an apertured metal cap including a main body portion and an outer flange, said flange being used for sealing the peripheral inactive portions of said rectifier plate, a contact member for said active surface mounted on the shaft between the rectifier plate and the main body portion of said cap, said contact member having a contact portion extending through the aperture in said cap and engaging an adjacent rectifier plate, and means associated with the shaft for providing a seal between an inner portion of said rectifier plate, the portion of said cap adjacent said aperture, and said contact member adjacent said shaft whereby the active surface of the rectifier plate is enclosed within a sealed chamber, said sealing means providing the proper spacing between adjacent cells of the rectifier.

4. A dry surface rectifier comprising a central supporting shaft and a plurality of rectifier cells mounted on said shaft, each cell comprising an apertured rectifier plate mounted on said shaft having an active surface for current rectification, an apertured metal cap including a main body portion and an outer flange, said flange being used for sealing the peripheral portions of said rectifier plate, a resilient electrical contact washer for said active surface mounted between the rectifier plate and said body portion of said cap, said contact washer having an electrical contact portion extending through and insulated from said cap for contact with an apertured rectifier plate of an adjacent rectifier cell, and means for providing a seal between an inner portion of said rectifier plate, the portion of said cap adjacent said aperture thereof, and the electrical contact washer adjacent said shaft whereby the active surface of the rectifier plate and the portion of said washer in contact therewith is enclosed within a sealed chamber, said sealing means providing the proper spacing between adjacent cells of the rectifier.

SOL BLUMENTHAL.

REFERENCES CITED

The following references are of record in the file of this patent:

UNITED STATES PATENTS

| Number | Name | Date |
| --- | --- | --- |
| 1,671,247 | Levy | May 29, 1928 |
| 2,302,087 | Addink et al | Nov. 17, 1942 |
| 2,343,379 | Kotterman | Mar. 7, 1944 |
| 2,383,735 | Kay | Aug. 28, 1945 |

FOREIGN PATENTS

| Number | Country | Date |
| --- | --- | --- |
| 163,675 | Switzerland | Nov. 1, 1933 |
| 693,239 | Germany | July 6, 1940 |